UNITED STATES PATENT OFFICE.

MYRON H. CLARK, OF PELHAM, NEW YORK, ASSIGNOR TO BOSTON RUBBER SHOE COMPANY, A CORPORATION OF MASSACHUSETTS.

RUBBER SOLE FOR BOOTS AND SHOES.

1,318,645.  Specification of Letters Patent.  Patented Oct. 14, 1919.

No Drawing. Continuation of application Serial No. 99,255, filed May 22, 1916, and a division of application Serial No. 107,853, filed July 6, 1916, which is a continuation of application Serial No. 878,935, filed December 24, 1914. This application filed May 6, 1919. Serial No. 295,168.

*To all whom it may concern:*

Be it known that I, MYRON H. CLARK, a citizen of the United States, residing at Pelham, county of Westchester, and State of New York, have invented certain new and useful Improvements in Rubber Soles for Boots and Shoes, of which the following is a full, clear and exact description.

This invention relates to rubber soles for boots and shoes and has for its primary object to provide a superior article at a reduced cost. This application is a division of my application Serial No. 107,853 and a continuation of my application Serial No. 99,255.

In manufacturing molded rubber soles the usual method is to fill the mold with the rubber compound and to vulcanize the sole while in the mold. Molds suitable for this purpose are expensive and have to be replaced by other molds to meet the change in styles of footwear. The molding process furthermore is slow so that a comparatively small output of soles requires a large expenditure for the molds. The molded sole has the further disadvantage that a thin flash of rubber is formed on the periphery of the sole between the mold sections, which is not removed without considerable trouble.

In the manufacture of soles by my method, the rubber may be mixed with suitable compounds in the usual way and when in proper condition it is subjected to the action of calender rolls to produce the desired sheet from which the soles are cut or stamped. There are many well known rubber compounds suitable for use in the manufacture of soles, and my application is not limited to any particular compound. For instance, in the publication entitled, "*The Manufacture of Rubber*," by Adolf Heil and Dr. W. Esch, edition of 1909, page 81, may be found compounds for soles containing among other ingredients, rubber gum, reclaimed rubber, carbon-black, litharge, whiting, sulfur, barytes, etc. There are however, such numerous and well known compounds that nothing further need be said here relating thereto.

In the manufacture of rubber soles for rubber boots or shoes wherein the soles are vulcanized to the uppers, the stock is sheeted out substantially as above mentioned and the soles are cut from the sheet usually in a transverse direction thereof. The soles are often of varying thickness in the direction of their length, and to accomplish this the calender roll is composed of circumferential bands of correspondingly varying diameter. The sheet of stock issuing from such a calender will thus be composed of bands of varying thickness running longitudinally, thereby making it necessary to cut the soles so that their lengths will run transversely of the sheet of stock, in order to produce the desired variations in the thickness of the sole at the toe, instep, and heel portions thereof. The usual practice in handling such stock is to permit the sheets to rest for a suitable period of time after they have been formed by the calendering machine to permit them to shrink and to assume permanent or normal conditions. The custom in most rubber factories is to permit the compounded rubber stock to rest for an appreciable time after it has been milled and prior to its being placed in the warming rolls which is the usual step preliminary to the sheeting of the stock by the calender rolls. The stock is also permitted to rest over night after it has been calendered, after which it is cut into soles, and in some instances this cutting is not performed until even the day following. The stock is quite hot when it leaves the calender rolls and requires a comparatively long time to sufficiently cool to assume normal or permanent conditions. When the stock is cooled it reaches the maximum shrinkage which is mostly in a longitudinal direction. The sheet also thickens up to an amount corresponding to the degree of shrinkage.

In carrying out my invention in its preferred manner, I follow the foregoing procedure as it provides a ready means of more closely determining in advance the ultimate sizes which the soles will assume and gives more positive results. While the stock during its rest period has assumed a permanent condition in so far as the green sheet is concerned, it is usual however, that during the vulcanizing process the sole in its transformation from the green to the vulcanized state assumes a further shrinkage depending in extent somewhat upon the ingredients used in forming the rubber compound.

This further shrinkage is quite uniform and with any given stock may be determined in advance so that the dies from which the soles are stamped or cut may be made correspondingly larger than the desired ultimate size of the sole to provide for this final shrinkage, which is mostly longitudinally of the sole, when the sole is cut transversely of the sheet.

Usually sheeted stock has greater strength longitudinally and greater flexibility transversely, in this regard resembling very much the nature of a structure having a grain or fiber running longitudinally. In the carrying out of my method the soles have been usually cut transversely of the sheet, that is to say, the length of the sole runs transversely of the sheet so that the sole possesses greater strength transversely and greater flexibility longitudinally. These conditions are well adapted to soles and give to a cut or calendered sole advantages not possessed by a molded sole.

The smooth rolls give the sole an irregular variation in thickness, the differences in height being separated by wavy lines running transversely of the sole. The irregularities are most manifest adjacent these wavy lines and give the sole the appearance of having what might be termed a pitted surface, the uneven portions being somewhat in the nature of flakes imperfectly adhering to the body of the sole and sometimes partly separating therefrom so that difficulty may in extreme cases be experienced in securely cementing the sole to an adjoining surface, such as the welt sole of the shoe.

In applying the cut or calendered soles to rubber boots and shoes, the usual practice has been to attach the sole to the shoe in its green or unvulcanized state and then to subject the entire article to the vulcanizing heat. This method, however, is not well adapted for shoes or boots having leather uppers as the leather will not withstand the degree of heat required for vulcanizing the rubber soles. Therefore, whenever rubber soles have been used upon leather footwear the molded sole has been resorted to.

While the extent of the unevenness or irregularity of the surface of the calendered sole is somewhat dependent upon the nature of the ingredients forming the rubber compound, and the temperature at which the calender rolls are run, I believe the pitting is primarily due to an alternate pulling and slipping action of the rolls upon the rubber compound. The compound is banked against the rolls and as it is drawn therefrom by the rolls into the space between them and travels out at the opposite side as a sheet, the rolls, on account of their smoothness, have a partial slipping action on the rubber surface so that the drawing of the rubber from the bank is not uniform, which results in producing the uneven flaky or pitted surface commonly designated in rubber factories as a fish-scale surface. I have found that if the rolls can procure a firmer grip into the rubber this unevenness may be regulated as desired or reduced to a minimum. In carrying out my invention, therefore, I may when desired, provide one or both of the calender rolls with a gripping surface, preferably by knurling the surface, although it is obvious that many other engraved designs may be resorted to.

Where smooth rolls are exclusively used, the surface of the stock is quite irregular, the irregularity depending somewhat upon the nature of the compound used, as has already been mentioned. Such soles may be salable in certain sections and adapted for certain uses, such as lumbermen's boots and for other rough usages where an attractive appearance is not sought. Furthermore, where only one of the rolls is smooth and the other knurled as described above there will obviously be two surfaces formed, the smooth roll producing the pitted surface and the knurled roll the engraved surface. The knurled roll will however, influence to some degree the action of the smooth roll, so that the pitted surface will not be so pronounced. Where both rolls are knurled both sides of the sole will present an engraved surface, although usually the wavy or fish-scale appearance is in evidence in combination with the knurled surface, but it is reduced to a minimum as above mentioned.

While the knurled appearance presents a surface more attractive for high class or dressy footwear, my invention is obviously in its broad aspect not limited to such a surface, but in its broadest phase comprises a vulcanized sole having the natural calendered surface, the words "natural calendered" being used in the sense that the vulcanizing process is so carried out that the finally vulcanized sole will not have lost the surface characteristics which the calender rolls have imparted to it regardless of what these characteristics may be.

In accordance with an important feature of my invention, I provide a sole, the surface of which possesses the characteristics of the sheet issuing from the calendering machine; that is, a sole having a natural surface. Prior to my invention, so far as I am aware, when vulcanized apart from the shoe, rubber soles have invariably been vulcanized in a mold, the members of which contact with the surface, and impart to the sole unnatural or polished surfaces substantially devoid of pits or irregularities or other configurations produced during the calendering process. In order to preserve the surface characteristic of the sheet as it issues from the calendering machine, I vulcanize the sheet in a free and unrestrained and unattached condition. I thus preserve the calendered structure possessed by the sheet.

Because of the vulcanization of the sole in a free and unrestrained condition, the particles of the material constituting the sole, being unrestrained, do actually, during vulcanization, flow or move about and accommodate themselves to each other in such a manner as to result in producing a superior article. The sole therefore has a surface, the particles of which are self-distributed and the particles of the sole are distributed in accordance with the normal or substantially free or unrestrained flow thereof. This not only preserves the natural, "calendered" surface of the sole, but obtains such a distribution of particles throughout the sole as to improve the product.

A sole made by the use of knurled rolls is characterized by having a substantially uniformly even surface in the sense that it does not possess the irregular haphazard unevenness of the sole made by the use of smooth rolls. When it is desired to provide a sole having an entirely smooth surface, the knurls or other design may be removed by buffing or otherwise treating the surface. In such case, the design may be made so small that it can be removed with but little trouble, whereas, to buff down the surface of a sole made by the use of smooth rolls would require considerable time and trouble and represent considerable loss of rubber, inasmuch as the buffing is performed after the sole has been vulcanized.

In the practice of my invention in its most preferred manner, the rubber is compounded with the desired ingredients in the usual manner upon mixing rolls. It is then formed into sheets by passing it between calender rolls maintained at suitable temperatures and engraved or not, as desired.

The sheeted rubber is then permitted to rest in the usual manner, and is finally cut or stamped transversely to form the soles which are placed in an unconfined condition upon shelves. These are placed in a vulcanizer and a fluid pressure, preferably of carbon dioxid gas, and heat applied to effect the vulcanization. The soles thus formed are homogeneous throughout and possess greater strength transversely and greater flexibility longitudinally, and where engraved rolls are used, have a regularly even surface or surfaces which are the counterpart of the design upon the roll or rolls.

While I prefer to cut the sole transversely from a single sheet, it may be built of any desired number of plies of the green stock, the grain of the various plies running in the same or in different directions in any desired manner, the several plies being taken from the same or different grades of stock. Where the soles are cut transversely of the sheet the calendered rolls may be varied in diameter at different portions to provide greater thickness of stock at any desired parts of the sole, as for instance at the toe or heel portions as is the usual practice in such articles. The rubber stock may be plied together in the sheet form or the several sheets may be first cut to form the laminations and these finally superimposed to form the sole. In either case the several plies are preferably brought into intimate association by means of pressure as by rolls or presses.

Having thus described my invention, what I claim and desire to protect by Letters Patent is:

1. An unattached, vulcanized, rubber sole for boots and shoes comprising rubber-containing material having a natural, "calendered" surface.

2. An unattached, vulcanized rubber sole for boots and shoes consisting of rubber-containing material having a wholly transverse, "fibrous" structure rendering said sole of greater transverse than longitudinal strength.

3. An unattached, vulcanized rubber sole for boots and shoes comprising rubber-containing material having greater transverse than longitudinal strength and greater longitudinal than transverse flexibility, and having a natural, "calendered" surface.

4. An unattached, vulcanized rubber sole for boots and shoes comprising rubber-containing material having a natural, "calendered", pitted surface and being of substantially homogeneous structure throughout.

5. An unattached, vulcanized rubber sole for boots and shoes comprising rubber-containing material having its constituent surface and internal particles self-distributed, and having its end portions shrunken.

6. An unattached, vulcanized rubber sole for boots and shoes comprising rubber-containing material having its constituent surface and internal particles self-distributed, said sole having its thickness increased by expansion of the material.

7. An unattached, vulcanized, rubber sole for boots and shoes comprising rubber-containing material having a natural, preserved, "calendered" surface, and being of greatest strength in a transverse direction and of greatest flexibility in a longitudinal direction, said sole being of substantially homogeneous structure throughout.

Signed at New York, county of New York, and State of New York, this 3rd day of May, 1919.

MYRON H. CLARK.